May 23, 1961 R. G. FOWLER ET AL 2,985,364

CALCULATING MACHINES ADAPTED FOR TAPE RECORDING

Filed Oct. 4, 1956 13 Sheets-Sheet 1

INVENTORS
ROLAND G. FOWLER
OSCAR F. LARSEN
PAUL A. DALE &
MARK J. GARVEY

BY Carl Beust
Justin W. Ormiston
THEIR ATTORNEYS

May 23, 1961 R. G. FOWLER ET AL 2,985,364

CALCULATING MACHINES ADAPTED FOR TAPE RECORDING

Filed Oct. 4, 1956 13 Sheets-Sheet 2

INVENTORS
ROLAND G. FOWLER
OSCAR F. LARSEN
PAUL A. DALE &
MARK J. GARVEY

BY Carl Beust

Justin [illegible]

THEIR ATTORNEYS

INVENTORS
ROLAND G. FOWLER
OSCAR F. LARSEN
PAUL A. DALE &
MARK J. GARVEY
BY Earl Beust
Justin S. Lampston
THEIR ATTORNEY INVENTORS
ROLAND G. FOWLER
OSCAR F. LARSEN
PAUL A. DALE &
MARK J. GARVEY
BY Earl Beust
Justin Kompton
THEIR ATTORNEYS

CALCULATING MACHINES ADAPTED FOR TAPE RECORDING

Filed Oct. 4, 1956 13 Sheets-Sheet 5

INVENTORS
ROLAND G. FOWLER
OSCAR F. LARSEN
PAUL A. DALE &
MARK J. GARVEY
BY Carl Beust
Justin S. Cranston
THEIR ATTORNEYS

CALCULATING MACHINES ADAPTED FOR TAPE RECORDING

Filed Oct. 4, 1956 13 Sheets-Sheet 6

INVENTORS
ROLAND G. FOWLER
OSCAR F. LARSEN
PAUL A. DALE &
MARK J. GARVEY
BY Carl Beust
Justin ... 
THEIR ATTORNEYS

CALCULATING MACHINES ADAPTED FOR TAPE RECORDING

Filed Oct. 4, 1956

INVENTORS
ROLAND G. FOWLER
OSCAR F. LARSEN
PAUL A. DALE &
MARK J. GARVEY
BY Carl Beust
Justin S Lonston
THEIR ATTORNEYS

INVENTORS
ROLAND G. FOWLER
OSCAR F. LARSEN
PAUL A. DALE &
MARK J. GARVEY

BY Carl Beust

Justin S. Compton
THEIR ATTORNEYS

INVENTORS
ROLAND G. FOWLER
OSCAR F. LARSEN
PAUL A. DALE &
MARK J. GARVEY
BY Karl Beust
Justin Livingston
THEIR ATTORNEYS

INVENTORS
ROLAND G. FOWLER
OSCAR F. LARSEN
PAUL A. DALE &
MARK J. GARVEY

BY Carl

Justin S

THEIR ATTORNEYS

May 23, 1961 R. G. FOWLER ET AL 2,985,364

CALCULATING MACHINES ADAPTED FOR TAPE RECORDING

Filed Oct. 4, 1956

13 Sheets-Sheet 11

INVENTORS
ROLAND G. FOWLER
OSCAR F. LARSEN
PAUL A. DALE &
MARK J. GARVEY

BY Carl Beust

Justin W. Lampton

THEIR ATTORNEYS

May 23, 1961 R. G. FOWLER ET AL 2,985,364

CALCULATING MACHINES ADAPTED FOR TAPE RECORDING

Filed Oct. 4, 1956

13 Sheets-Sheet 12

INVENTORS
ROLAND G. FOWLER
OSCAR F. LARSEN
PAUL A. DALE &
MARK J. GARVEY

BY Carl Beust

Justin Kompton

THEIR ATTORNEYS

May 23, 1961 R. G. FOWLER ET AL 2,985,364

CALCULATING MACHINES ADAPTED FOR TAPE RECORDING

Filed Oct. 4, 1956 13 Sheets-Sheet 13

INVENTORS
ROLAND G. FOWLER
OSCAR F. LARSEN
PAUL A. DALE &
MARK J. GARVEY

BY Carl Beust

Justin S. Johnston

THEIR ATTORNEYS 2,985,364

CALCULATING MACHINES ADAPTED FOR TAPE RECORDING

Roland G. Fowler, Newfield, and Oscar F. Larsen, Paul A. Dale, and Mark J. Garvey, Ithaca, N.Y., assignors to The National Cash Register Company, Dayton, Ohio, a corporation of Maryland Filed Oct. 4, 1956, Ser. No. 614,005

3 Claims. (Cl. 235—61)

This invention relates to calculating machines adapted to control data-handling devices, such as, for one particular example, a tape recording device.

The basic machine is a two-total add-subtract calculating machine with printing mechanism and a paper carriage for column printing, such as is disclosed in United States Patent 2,692,726 which issued on the application of Nelson R. Frieberg et al., on October 26, 1954, to which reference is made although enough of the basic mechanism will be described herein to give an understanding of the construction and operation of the machine.

The basic machine is provided with ten rows of digit keys, there being nine keys in each row to represent the digits from 1 to 9 inclusive; a cyclically operable machine drive mechanism having a single cycle operation for data entry and a double cycle operation for data reading or withdrawal; an add bar for initiating a cycle of operation in which data set up on the digit keys is entered additively into both totalizers and printed; a subtract bar for initiating a cycle of operation in which the data set up on the digit keys is entered subtractively into both totalizers and printed; a non-add key for initiating a cycle of operation in which data set up on the digit keys is printed but not entered into the totalizers; a correction key for returning operated digit keys to unoperated condition before the initiation of a machine cycle; a repeat lever for disabling a digit key restoring means operated by the machine drive means; a sub-total control bar, operation of which initiates a two cycle operation in which the data in one of the totalizers is printed; a total control bar, operation of which initiates a two cycle operation in which the data in said one of the totalizers is printed and cleared from the totalizer; and a key operable in conjunction with either the sub-total bar or the total bar for selecting the other of the two totalizers for sub-totaling or totaling.

The novel mechanism includes multiple-point switches selectively positioned during a machine operation according to the value of the depressed keys, other multiple point switches set in accordance with the type of machine operation, means for resetting the switches to normal at the beginning of a machine operation, a "void" key mechanism to signal the data set on the switches and transferred to tape is to be disregarded, and various interlocking means to be described.

The invention includes certain novel features of construction and combination of parts, a preferred form or embodiment of which is hereinafter described with reference to the drawings which accompany and form a part of this specification.

Of the drawings:

Fig. 1 is a plan view of the keyboard;

Figs. 2A and 2B, together, constitute a left side elevation of the machine with the case removed;

Figs. 3A and 3B, together, constitute a right side elevation of the machine with the case removed;

A tape punch recorder with which this machine may be used is disclosed in the application for United States Letters Patent, Serial No. 550,728, filed by Elmer A. Gerdemann on December 2, 1955, now Patent No. 2,896,713.

*Main drive mechanism*

Figure 2A:
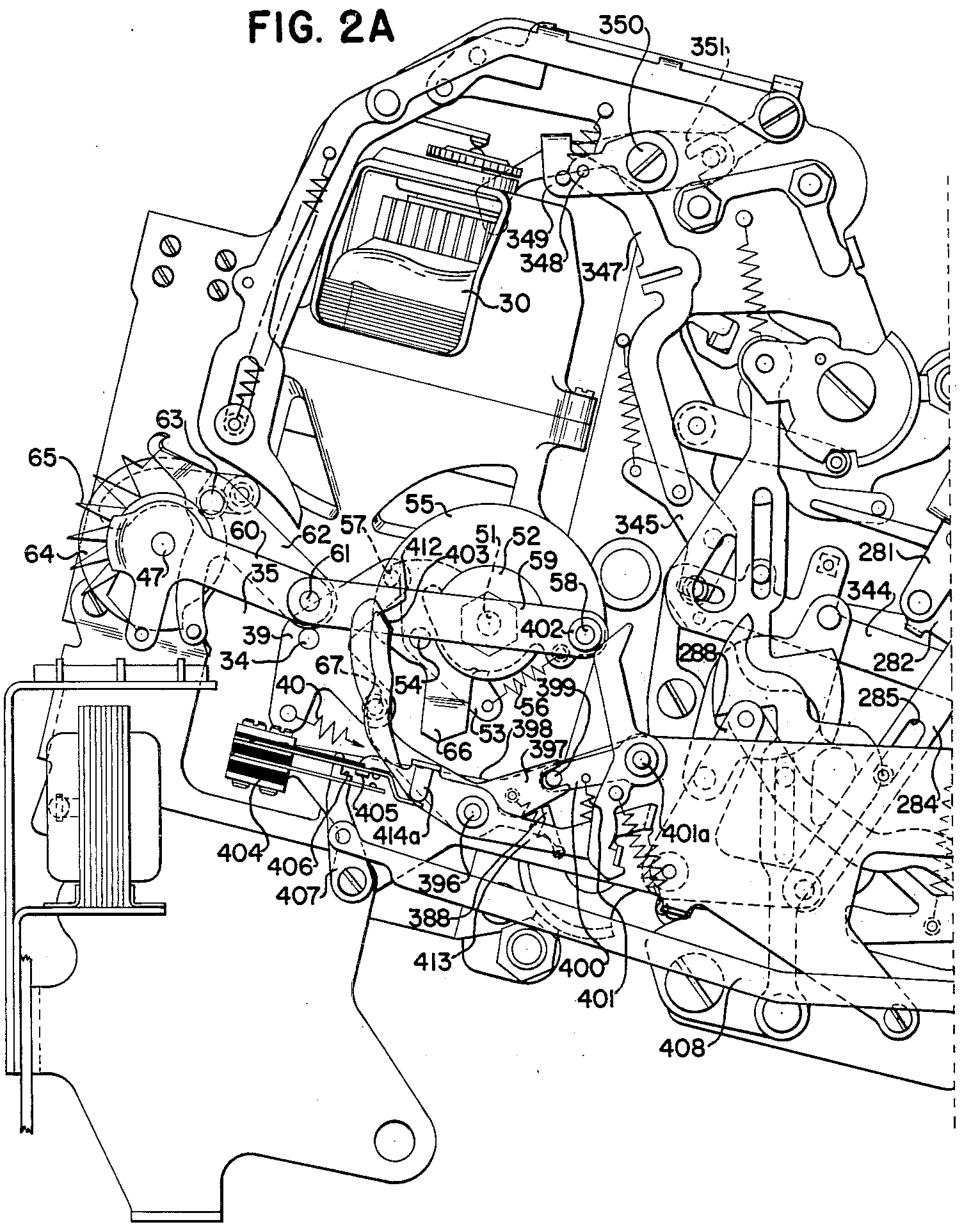
Figures 5, 6, 7:
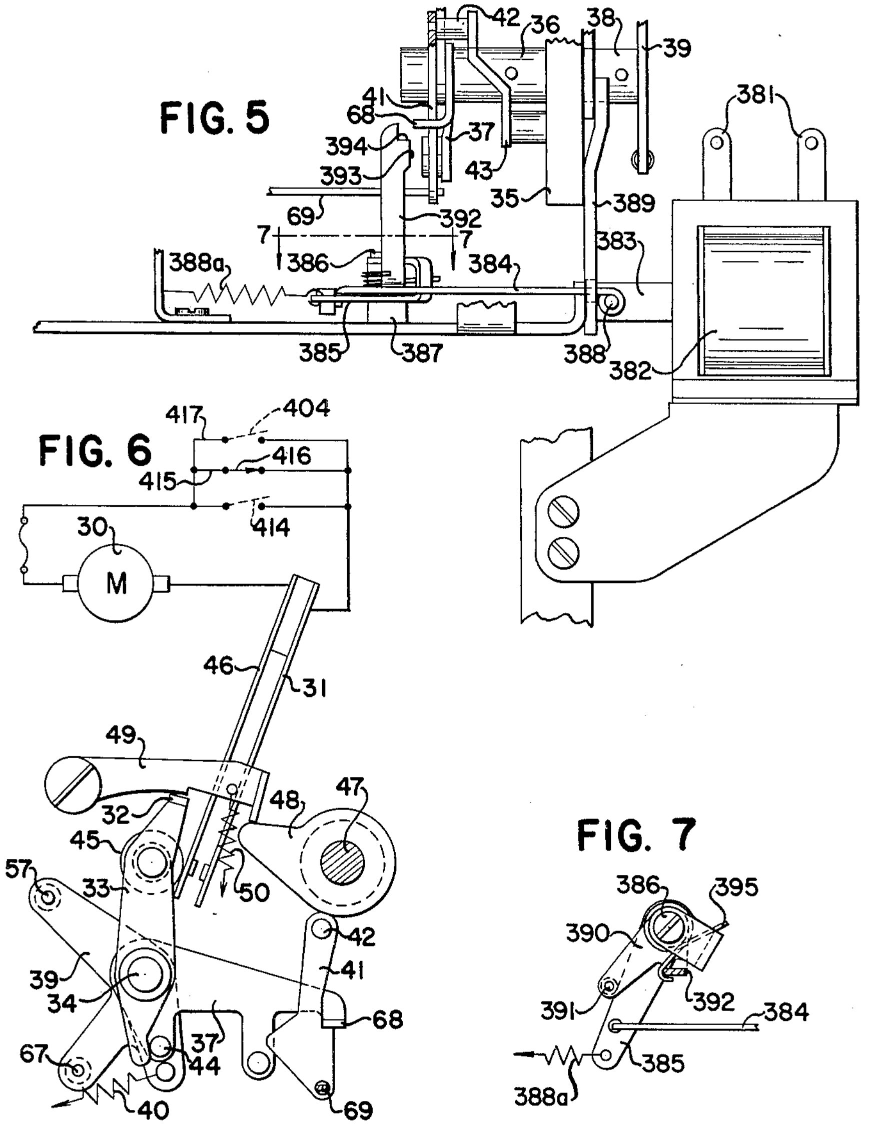
Fig. 5 is a rear elevation of the machine trip mechanism and the means for preventing the machine from cycling while the associated punched tape recorder is in operation.
Fig. 6 is a right side elevation of the machine trip mechanism.
Fig. 7 is a detail of the machine cycle trip latch mechanism taken on the line 7—7 of Fig. 5.

Referring to Figs. 2A, 5 and 6, the machine is driven by an electric motor 30, upon the closing of a switch 31, which connects the motor to a source of electric current.

The switch 31 is closed by roller (Fig. 6) on a lever 33, rotatably mounted on a shaft 34, journaled in a left vertical frame plate 35 (see Fig. 5). Pinned to shaft 34 on the inside of frame 35 is a collar 36 having secured thereto a multiple-armed lever 37, and pinned to the outer end of shaft 34 is a collar 38, to which is secured a three-armed cycle-control lever 39. Referring especially to Fig. 6, the multiple-armed levers 37 and 39 are always urged in a clockwise direction by a spring 40, which also is shown in Fig. 2A, but are normally restrained from so moving by a trip latch 41, secured to a stud 42, extending from a bracket 43, fastened in frame plate 35 (Fig. 5). If trip latch 41 is swung clockwise, as seen in Fig. 6, the lever 37 will also turn clockwise, because of spring 40, and a stud 44 thereon will strike the lower end of lever 33, turning it clockwise so that roller 45 will press against switch blade 46, closing the motor circuit and starting the motor. As will be described shortly, the operation of the motor causes the rear drive shaft 47 to oscillate first counterclockwise and then clockwise to home position, as seen in Fig. 6. A cam lever 48 secured to shaft 47 normally holds a detent 49 away from ear 32 of lever 33, toward which it is urged by spring 50, but as lever 48 moves counterclockwise the shoulder of the detent 49 will fall behind ear 32 of lever 33 as it is moved clockwise, holding the switch 31 closed until toward the end of the operation. Cam lever 40 on return movement at the end of the cycle strikes the rearward end of detent 49, lifting it off of ear 32 and allowing the switch 31 to open. The motor 30, through reduction gearing, drives a horizontal shaft 51 (Fig 2A) in a counterclockwise direction. Secured to shaft 51, behind a plate 52, is a notched gear which is adapted to be engaged by the end of a pawl 53, pivoted at 54 to a crank plate 55, rotatably mounted on shaft 51. Pawl 53 is normally urged counterclockwise into engaging position with the notched wheel on shaft 51 by a spring 56, but when lever 39 is in home position, a stud 57 thereon bears against the other end of pawl 53, holding it from engaging the notched wheel. If the trip latch 41 (Fig. 6) is rocked clockwise, the levers 37 and 39 will rock clockwise, as seen in Fig. 6, and the stud 57 will be moved away from the end of pawl 53, with which it makes contact, allowing the pawl to engage the notched wheel on shaft 51. It will thus be evident that, as the motor is started the pawl 53 is engaged with the notched wheel on shaft 51, and because of it being mounted on crank plate 55, the crank plate commences to move counterclockwise, as seen in Fig. 2A. Pivoted to crank plate 55 at 58 is a drive link 59 pivoted to a bell crank lever 60, loosely mounted on shaft 47. Also pivoted to drive link 59 at 61 is a lever 62 having a roller stud 63 mounted near its outer end, which cooperates with a notch in a drive plate 64, secured to shaft 47. A spring 65 attached to the outer end of lever 62, holds stud 63 in the notch in plate 64 to form a breakable connection, which will disconnect the motor drive from the main shaft 47, in the event the machine becomes stalled.

As the crank plate 55 nears the end of its rotation a cam portion 66 strikes a roller 67 on the downwardly and forwardly extending arm of the cycle control lever 39, rocking said lever 39 clockwise, as seen in Fig. 2A and counterclockwise as seen in Fig. 6. Referring to Fig. 6, as the lever 39 is rocked counterclockwise it carries lever 37 with it, and allows trip latch 41 to engage ear 68 of lever 37 to hold it in home position. In this position the switch 31 is open, the cam lever 48 having by that time released detent 49. The trip lever 41 is moved to tripping position by the tip end 69 of a lever pivoted at its other end to the bottom of the machine frame, and which is coupled by a link 70 (Fig. 3A) extending toward the front of the machine and the forward end of which is pivoted to the lower extending arm of the main machine trip lever 71 pivoted to the right side frame plate at pivot 72. The forwardly extending arm of the 4-armed trip lever 71 has an ear 73, which is held against the right side frame plate 74 by a spring 75, and thus the link 70 is constantly urged rearwardly. The rearward movement of link 70, through the tip end of 69 of the lever to which it is coupled constantly urges the trip latch 41 to latch in position. Thus, unless prevented, the machine, when tripped, operates to rock the rear drive shaft 47 (Fig. 2A) first clockwise and then counterclockwise to drive the machine through a single cycle operation. In total and sub-total taking operations, the machine has a two-cycle operation in which the trip latch, through the main trip lever 71, is held against latching between the first and second cycles.

Figure 3A:
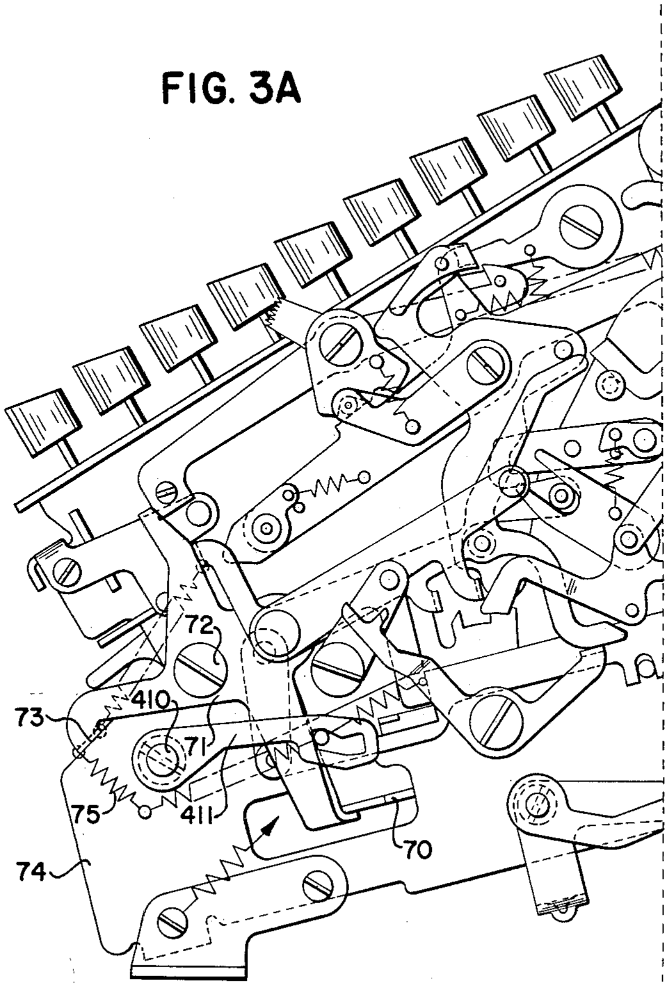
Figure 3B:
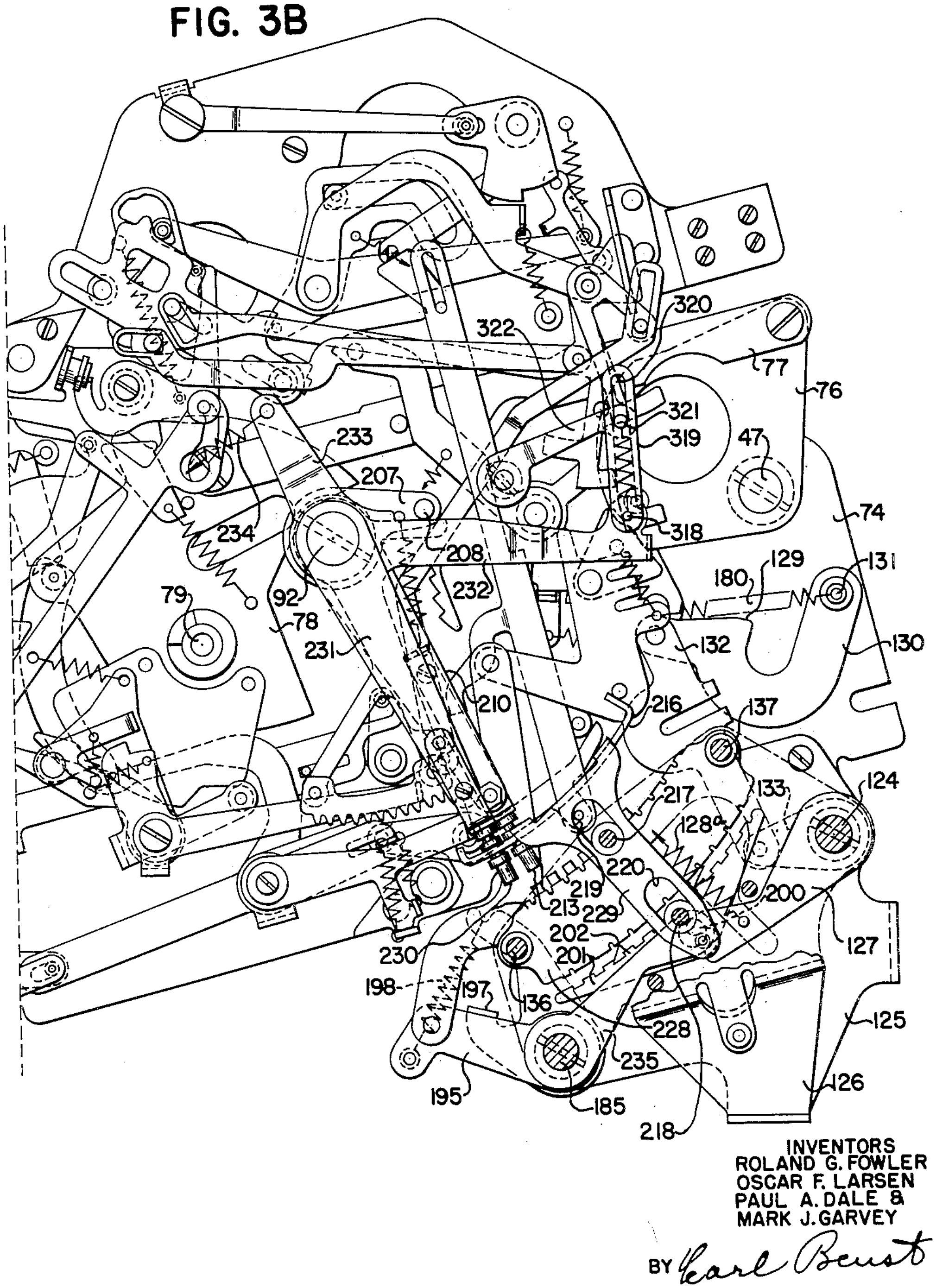

Referring to Fig. 3B, the rear drive shaft 47 has secured to its right end a rear drive plate 76 connected by a forwardly extending link 77 to a forward drive plate 78, secured to a forward drive shaft 79.

*Differential and totalizer mechanism*

Figure 4:
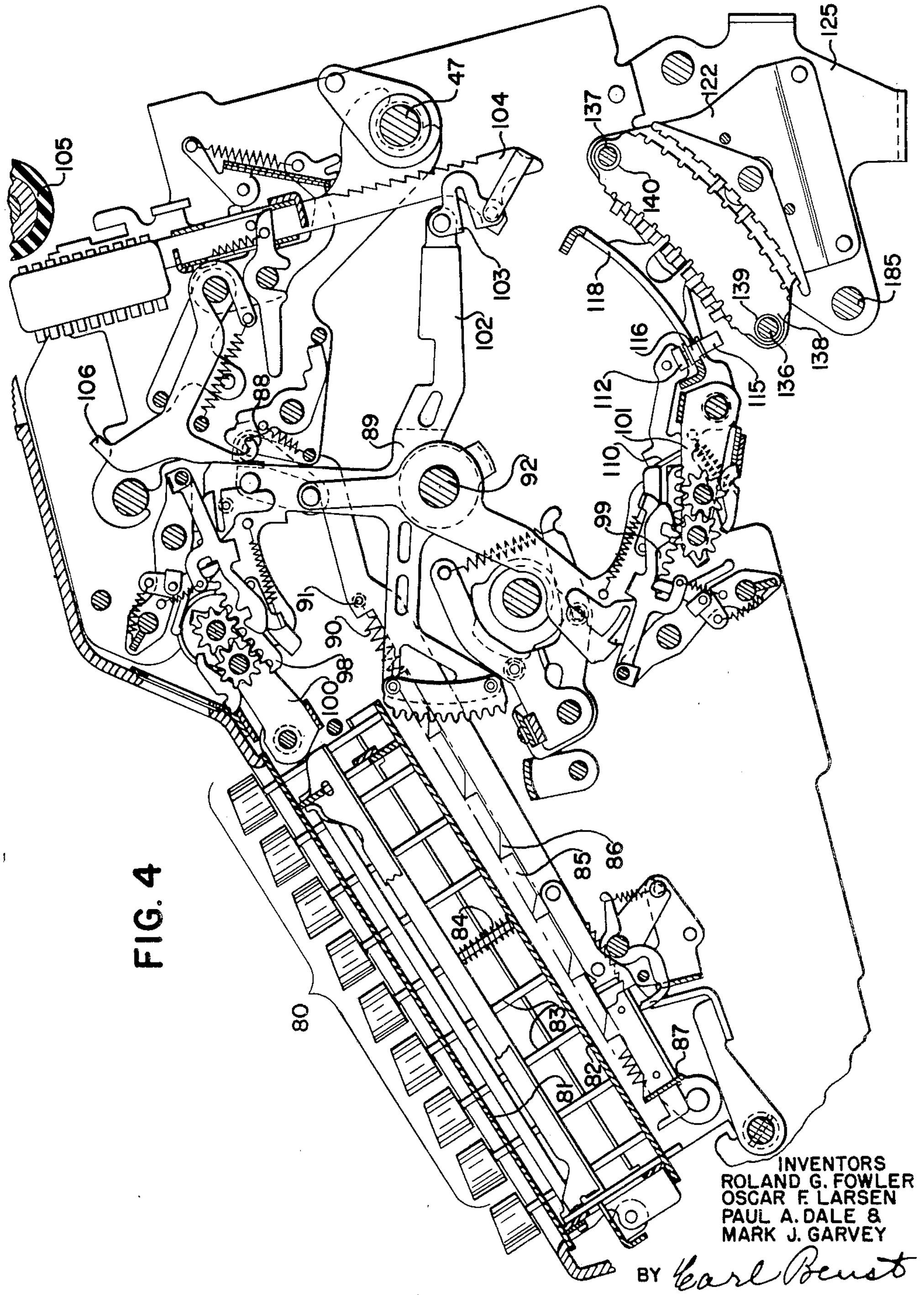
Fig. 4 is a vertical section from front to rear showing a typical digital denominational order of the keys, differential mechanism, totalizer mechanism, printing mechanism, and novel recorder control switch mechanism, as viewed from the right.

Referring to Fig. 4, which shows a front to rear vertical cross section to one side of a typical amount key bank, the nine digit keys in the bank are represented by the reference numeral 80, they being slidably mounted in plates 81 and 82, having alined slots therein for reception of the key stems 83, and normally being held in a raised position by reason of each having a spring 84 surrounding the stem and urging it upwardly. On operation of any key by depression thereof, the key is maintained in the depressed condition by key latch means, which it is not necessary to describe for an understanding of this invention, the depression of the key causing the lower end of the stem of that key to pass through its slot in lower plate 82 and project into the path of an associated stop bar 85, having teeth, like tooth 86, which will cooperate with an associated downwardly extending key stem when the stop bar is moved forward, as will be described. There is a stop bar 85 for each denominational order of keys, the forward end of each stop bar being slidably mounted in a slotted comb piece 87 extending across the front of the machine beneath the keyboard, and the rear end of each being pivoted as at 88, at its rear end, to the upwardly extending arm of an associated 4-armed diverging lever 89. Each stop bar has a spring 90 secured to it by a stud 91, the forward end of the spring being secured to the comb piece 87. The diverging levers 89 are rotatably mounted on a cross shaft 92 extending between the side plates of the machine. The result is that all of the diverging levers for the amount banks are constantly urged counter clockwise, as seen in Fig. 4, but normally are prevented from moving forward, to be stopped by the depressed keys, by a bail 93 (Fig. 11) extending across the upwardly extending arms of all the diverging levers 89. This bail is held at its left end by a support pivoted on shaft 92 and at its right end by a similar support mounted on shaft 92, the right support having a lower extending arm 94, which is pivoted to a slide 95, which is bifurcated at its rear end to ride a collar on the rear drive shaft 47. The rear drive shaft has pinned to it a cam 96 which, when the machine is in home position bears against the roller 97 on slide 95, holding the bail 93 and the diverging levers and associated stop bars in home position. As soon as the machine cycle commences, cam 96 moves out of the path of the roller 97 permitting counter clockwise movement of the arm 94 and its associated lefthand arm, so that the bail 93 moves away from the upper extending arms of the diverging levers, allowing the stop bars to move forward to be stopped against the depressed keys so that the diverging levers, by their individual movements represent the values of the amounts set up on the keyboard. In the last half of a machine cycle the bail 93 moves back against the diverging levers and brings them to home position.

Referring to Fig. 4, the upwardly and downwardly extending arms of the diverging lever have coupled thereto totalizer actuating racks 98 and 99, respectively, the rack 98 actuating the upper or "A" totalizer 100 and the rack 99 actuating the lower or "B" totalizer 101. The rearwardly extending arm 102 of each diverging lever is coupled by a link 103 with the bottom end of an associated type bar 104, which is raised, during the machine operation, according to the value of a depressed digit key of the associated amount bank. This positions, in front of a paper holding platen 105, the type character of equivalent value which is struck by the printing hammer 106 at approximately mid-cycle.

The foregoing machine drive and differential mechanism, as well as totalizer engaging and key release mechanism, is fully described in the before-mentioned United States Patent 2,692,726 of Nelson R. Frieberg, et al., and as the operation of such totalizer engaging and key release mechanism is not necessary to an understanding of the invention, reference is made to that patent, if a more detailed description is desired.

*Amount bank switches and setting mechanism*

Figure 11:
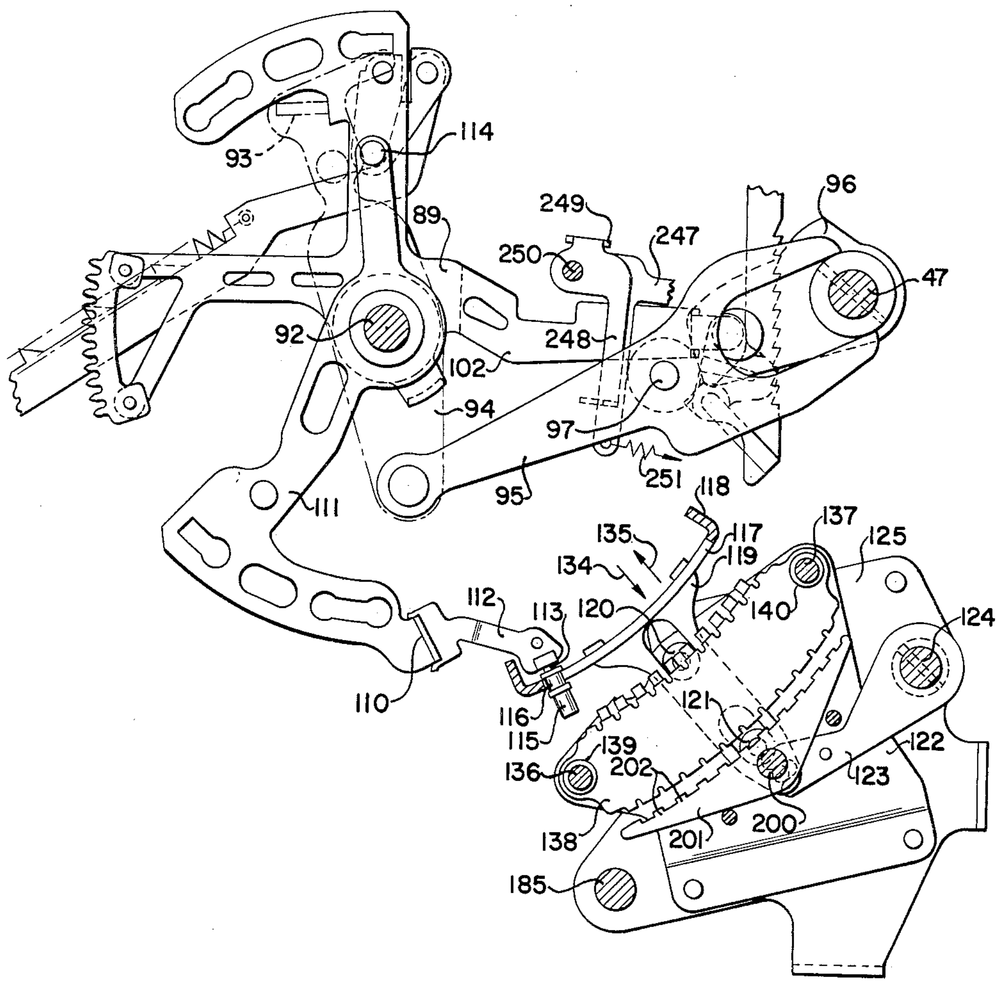
Fig. 11 shows the differential of a typical amount bank, including the switch selecting means, switch bank, and actuating means.

Secured to an ear 110 (Fig. 11) extending from the rear end of the downwardly extending arm 111 of each of the diverging levers 89 is a bracket 112, holding a pin 113. At this point it may be said that the downwardly extending arm of the diverging lever 89, appearing to be a separate piece rotatably mounted on shaft 92, as seen in Fig. 11, really is fastened to the diverging lever 89 by a stud 114 so that the two pieces work as a unit. Each of the pins 113 has a sleeve 115 which fits over and slides on its associated pin. Each sleeve has a circumferential flanged groove 116, each of said grooves being associated with an associated slot 117 in a guide and actuating member 118. The guide and actuating member 118 runs across all the amount key banks, and has a slot 117 for each denominational order, in which the associated pin 113 rides, the slot length being equivalent to the movement of the pin 113 when moved from home position (seen in Fig. 11) to the extreme position under control of the associated "9" key. The left end of the guide and actuating member 118 is supported by a slotted bracket 119, which rides pins 120 and 121 in a left auxiliary frame plate 122. The right end of member 118 is supported in a similar manner by studs in an auxiliary plate similar to plate 126. In order to keep the guide and actuating member 118 in the normal "up" position there is provided at the left end a forked lever 123, pinned to a shaft 124, which runs across the back of the machine and is supported by a left auxiliary plate 125 and a similar one 126 on the right side of the machine (see Fig. 3B). Forked lever 127 and others pinned to shaft 124 are urged clockwise by spring 128*a* which urges shaft 124 clockwise, and consequently the forked lever 123, so that the guide and actuating member 118 is resiliently held so that the guide pins 120 and 121 on the left and corresponding pins on the right slotted member are in the bottoms of the slots and the member elevated, as shown in Fig. 11.

Figure 14:
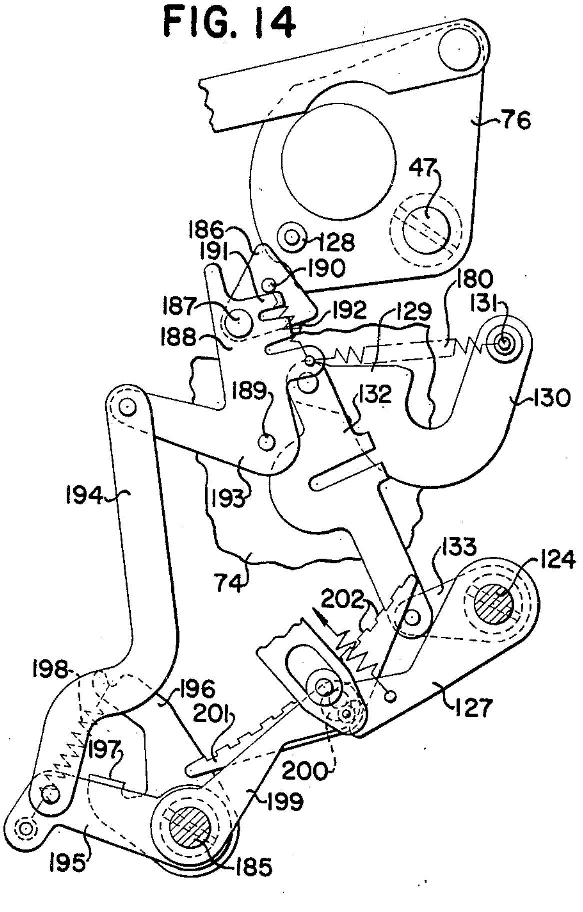
Fig. 14 shows the power mechanism for restoring the switches and resetting them during a machine operation.
Figure 16:
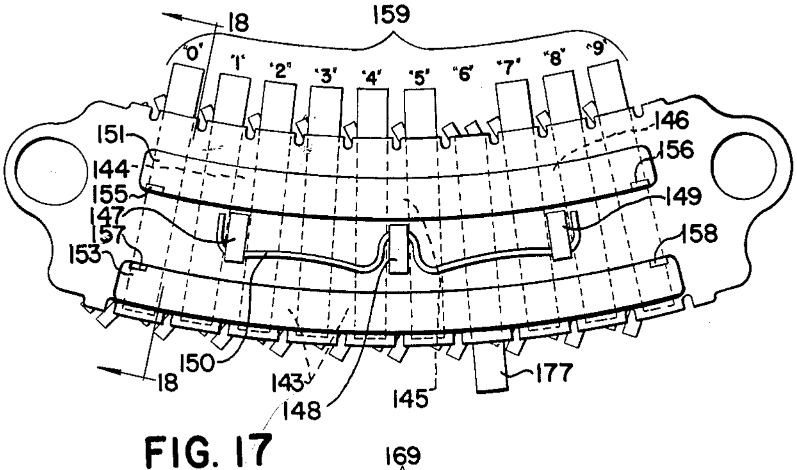
Fig. 16 is a side elevation of one of the switch bank units.
Figure 17:
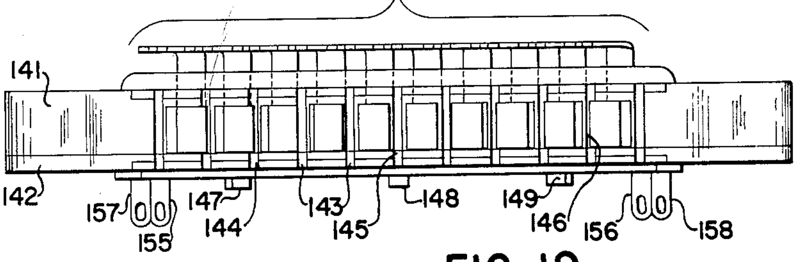
Fig. 17 is a top plan view of the switch bank of Fig. 16.
Figure 18:
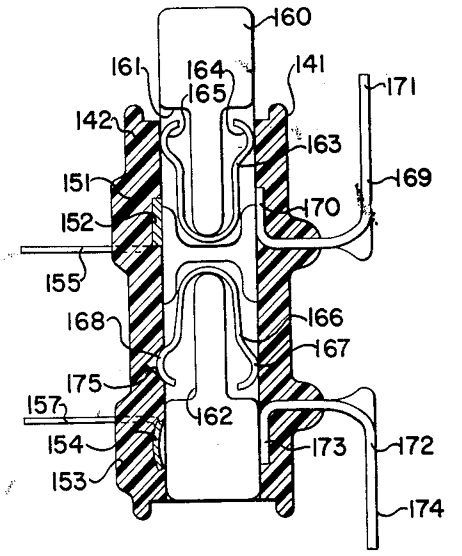
Fig. 18 is an enlarged sectional view of Fig. 16 on the line 18—18 thereof.

Referring to Figs. 3B and 14, the rear drive plate 76, as before described, is oscillated during a machine cycle, first in a counterclockwise position and returned clockwise on the second half of the machine cycle. There is provided a roller stud 128 on drive plate 76, which, near the end of the first half of a machine cycle strikes surface 129 on a bell crank lever 130, pivoted at 131 to the right vertical side frame plate 74. The forward end of bell crank lever 130 is pivoted to a link 132, which in turn is pivoted to an arm 133 (see also Fig. 14), said arm 133 being pinned to shaft 124. This rocks shaft 124 counterclockwise during the middle of a cycle of machine operation, as viewed from the right end, and said shaft is returned shortly after mid-cycle as roller stud 128 leaves surface 129. Thus the guide and actuating member 118 (Fig. 11) is moved near the end of the first half cycle in the direction of the arrow 134, and returned to home position in the direction of the arrow 135 at the very beginning of the second half-cycle of a machine operation. In such movement the sleeves 115 of the various amount banks actuate the switches, next to be described, in their various denominational orders. Referring to Figs. 4 and 11, there are two support rods 136 and 137 held between left auxiliary frame plate 122 on the left side of the amount section of the machine, and a similar auxiliary support plate on the right side of the amount section of the machine and on these rods are a series of switch units 138 of arcuate contour with respect of shaft 92, there being one switch unit for each amount denominational order and they are arranged in alinement with the sleeves 115 of the associated amount banks. The switch units are spaced on rods 136 and 137 by insulating collars 139 and 140, to keep their alinement. The construction of these switch units is shown in Figs. 16, 17 and 18, to which reference is directed. Each switch unit consists of an insulating body 141 and a cap-piece 142, also of insulating material, molded preferably of wear-resistant "Nylon." The body is molded with radial channels, 10 in number, to correspond with the digits 1 to 9 and zero, the channels being separated by partition walls, such as 143, extending toward the cap-piece 142 and flush with it, with the exception that walls 144, 145 and 146 have tenons 147, 148 and 149, respectively, which extend into and through mortise holes in the cap-piece 142, the underside of the tenons being notched to receive a retaining spring 150 to hold the body and the cap-piece firmly together. On the inside of the cap-piece, opposite a reinforcing formation 151 on the outside of the cap-piece, said reinforcing formation being arcuate, as shown in Fig. 16, is an electric bus conductor 152 (Fig. 18), having a flat arcuate surface which opens onto all the radial channels. A second arcuate reinforcing formation 153 has molded integral with it a dished electric bus conductor 154, also of arcuate formation opening onto the bottom of all of the radial channels, as seen in Fig. 18. The conductor 152 has extending therefrom at either end to the outside of the cap-piece like terminals 155 and 156, and likewise conductor 154 is equipped with externally extending terminals like terminals 157 and 158. For each amount switch bank unit there are provided 10 plungers, one for each of the channels, these plungers being shown collectively by bracket 159 in Fig. 16. A particular one of these plungers 160 is shown in Fig. 18 as it appears from the section 18—18 in Fig. 16, riding in its channel in the "up" position. On each side of each plunger is an upper U-shaped recess 161, and a lower U-shaped recess 162. In recess 161 is positioned a modified U-shaped conductor 163, of spring material, having contact portions 164 and 165, portion 164 riding the inside wall of the insulating body 141 and formation 165 riding the inside wall of cap-piece 142. In the lower U-shaped recess 162 is a similar modified U-shaped electric conductor 166 having an arcuate formation 167 riding the inside wall of body 141 and an arcuate formation 168 riding the inside wall of cap-piece 142. There are 10 terminal contacts like contact 169 molded integrally with switch body 141, there being one contact for each channel and having a contact portion 170 facing its associated channel and an external portion 171 for making connections thereto. These contacts 169 are shown by the bracket, with the same reference number in Fig. 17, collectively. At this point it may be said that the modified U-shaped conductors 163 and 166 are duplicated on the opposite sides of each plunger, the contact surface 170 being wide enough so that if the plunger 160 is depressed the two upper contacts will make pressure contact with portion 170. Cooperating with the lower U-shaped conductors 166 are a series of 10 contacts 172, molded integrally with the body portion 141, there being one contact 172 for each channel, each contact having or facing its corresponding channel or portion 173 and an external portion 174 for making connections thereto. As with the upper U-shaped conductor 163, the lower U-shaped conductors 166 are duplicated on the other side of the plunger. The portions 173 of the contacts 172 are wide enough to accommodate the U-shaped conductors on both sides of the plunger. Therefore, if the plunger 160 is in the upper position, no connection exists between electric conductor 152 and the contact 169, or between conductor 154 and contact 172. In the upper position of the plunger 160, as shown in Fig. 18, the arcuate formation 168 engages a groove 175 on the inside surface of cap-piece 142, and in the lower position of the plunger the arcuate contact 168 engages the dished surface of bus conductor 154 so that the plunger 160 is resiliently detained either in the position shown in Fig. 18 or in the condition in which the plunger is depressed. In Fig. 16, a depressed plunger 177 represents the value of "6" indicating that the 6 key of the associated denominational key bank has been depressed and the machine caused to perform an entry cycle of operation. This connects both conductor 152 with its associated contact 169 and conductor 154 with its associated contact 172.

It is apparent that in order to make another entry operation, the plunger 177 must be returned to the up condition, which operation is performed at the beginning of the next cycle of operation in the manner next to be described.

*Digit-representing switch restoring means operative at beginning of an entry cycle*

Journaled in left auxiliary frame plate 125 (Fig. 11) and a similar auxiliary frame plate on the right side of the machine is a shaft 185 operable by first being rocked counter clockwise and then clockwise in the first part of the first half of a machine cycle, the action of which restores depressed plungers, as will now be described, in connection with Figs. 3B and 14. As has been described, the rear drive plate 76, pinned to the rear drive shaft 47, is rocked first counter clockwise and then clockwise, as seen in Figs. 3B and 14. Roller stud 128, secured to drive plate 76 (Fig. 14), early in the first half of a machine cycle, strikes the rear edge of a by-pass pawl 186 pivoted at 187 to a bell crank lever 188 which is itself pivoted at 189 to the right vertical frame plate 74 of the machine. A stud 190 in by-pass pawl 186 normally is held in contact with finger 191 on bell crank lever 188, so that as roller 128 strikes the by-pass pawl on the first half of a machine cycle, the by-pass pawl being held against bell crank lever 188 by reason of spring 192, so that bell crank lever 188 is rocked counter clockwise around stud 189. On the forwardly extending arm 193 of bell crank lever 188 is pivoted a link 194, the lower end of which in turn is pivoted to a lever 195, which is itself loosely mounted on shaft 185. Pinned to shaft 185 is a bell crank lever 196, having an ear 197 resting on the upper surface of lever 195 and the ear 197 is held in firm contact therewith, resiliently, by a spring 198 extending between the outer end of the upper arm of bell crank 196 and the outer end of lever 195, so that for all normal purposes, the movement of bell crank 193 is conveyed by means of ear 197 and spring 198 to the shaft 185, so it rocks counterclockwise during the first part of a machine cycle. At various intervals along the shaft 185 are pinned arms like arm 199, there being one just to the left of the left-most switch unit associated with the highest denominational order of the digit keys and one just to the right of the switch unit associated with the lowest order of the digit keys. Supported between the outer ends of these arms, like arm 199, is a shaft 200, best seen in Fig. 11, on which are mounted a plurality of rocker arms 201, there being one located in line with each digit key switching unit, and each being provided with teeth like teeth 202 (Fig. 11) there being one tooth for each plunger of the associated switching unit and located radially in line with each of said plungers. As the shaft 185 rocks first counter clockwise, the rocker arms will be thrown up against the bottom edges of the associated key bank switch units to restore to the upper position any plunger which has been depressed in the preceding machine operation. The shaft immediately rocks clockwise, under the influence of spring 180, as the by-pass pawl 186 is passed by roller 128 and the rocker arms are restored to normal ineffective position. This readies the key bank switches for the ensuing entry of data, according to the keys depressed in the respective banks.

It will thus be understood that the switches of the key bank units are set according to the depressed keys in a given operation at about the middle of the cycle, and restored to normal position at the beginning of the next machine cycle.

Figure 19:
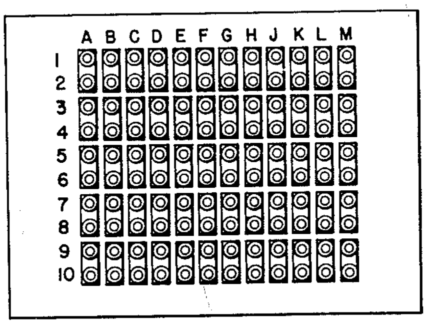
Fig. 19 is a typical terminal board to which the various switch points may be connected according to the desired code.

Therefore, according to the requirements of the tape punch recorder, the common electric conductors 152 and 154 (Fig. 18) in each one of the switch units may be electrically energized by the recorder unit through a switch block such as shown in Fig. 19, either individually or in parallel, and the contacts 169 and 172 may be connected to the recorder through the switch block of Fig. 19 to energize contacts therein for punching the proper amounts, by code, as it is desired to set it up, during the machine operation.

Because there are two of the U-shaped conductors 163 (Fig. 18) between each contact 169 and common conductor 152, there is a double safety factor in that the portion 170 is wide enough so that both may brush across it. The same can be said of U-shaped conductors 166. If it is desired to run the common conductors 152 and 154 in parallel, instead of there being a safety factor of two in making the contacts, there is a safety factor of four, it being assumed that contacts 169 and 172 for a given plunger are connected together.

So far the switching mechanism discussed pertains only to the amount banks. Next will be disclosed the switching and printing control mechanism associated with the type of operation mechanism.

*Type of operation printing and switching mechanism*

Figure 8:
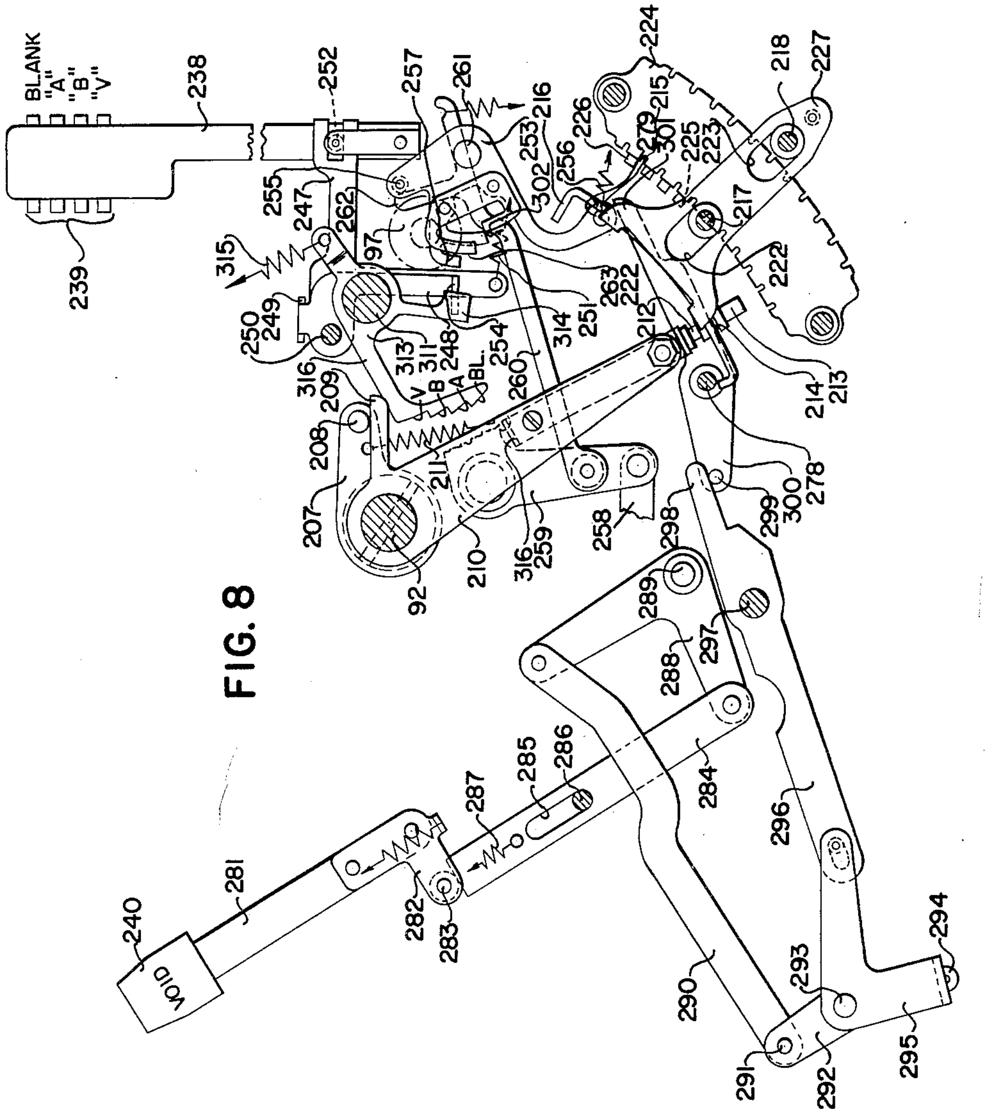
Fig. 8 is a detail of the mechanism showing the means by which the sign type-bar and switch setting controls are adjusted by the "Void" key.

Referring to Figs. 3B and 8, there is pinned to shaft 92 an arm 207, having a stud 208 which bears against a rearwardly extending arm 209 of a downwardly and rearwardly extending lever 210, loosely mounted on shaft 92 and resiliently held against stud 208 by a spring 211. As has been explained in connection with Fig. 11, the shaft 92 is rocked counter clockwise and then clockwise to home position during a machine operation, the counter clockwise movement being in the first half-cycle and the clockwise movement in the second half-cycle. Lever 210 has secured to its lower end a pin 212, over which slides a sleeve 213 having flanged groove 214, the groove riding in a slot 215 in an auxiliary guide and actuating member 216 associated with the operation control mechanism, said member being mounted to the right side plate 74 in line with actuating and guide member 118 (see Fig. 4). Member 216 is mounted like member 118, and like member 118 has at either end a bracket like bracket 227 supporting the left end of said member 216. Said bracket 227 has slots 222 and 223 radial to shaft 92, said slots embracing studs 217 and 218 in an auxiliary side frame plate. The right end of member 216 is supported in a similar manner, and allows the said auxiliary guide and actuating member 216 motion toward and away from switching units 224 and 228 (see Figs. 3B and 8), to be described. The right support bracket for auxiliary guide and actuating member 216 is shown at 229 in Fig. 3B. In this "type of operation" switching mechanism, there are three switching units 224 (Fig. 8), 228 (Fig. 3B) before mentioned, and one in between the two (not shown). Switching unit 228 and the middle one, which was not shown, are operated by pin 230 (Fig. 3B), supported on arm 231, mounted on shaft 92. Another arm in back of arm 231, has a pin similar to pin 230, which operates the said middle switching unit. The arm back of arm 231 has a rearwardly extending arm 232 and a portion 233 extending upwardly to which a spring 234 is secured, tending to move the two connected arms counter clockwise, as seen in Fig. 3B. The auxiliary guide and actuating member has a third slot in which pin 213 rides, said slot being the leftmost one. Arms 210, 231 and 232 move counter-clockwise as arm 207 rocks first counter clockwise in the first half of the machine cycle and then clockwise back to home position, the stud 208 bringing them back to home position as the cycle ends.

At mid-cycle, after the arms 210, 231 and 232 are set differentially, as will be described, the guide and actuating member 216 moves downwardly and rearwardly, as guided by the slots in the supporting brackets, to cause the pins to operate the switch plungers exactly in the same manner as described in connection with the switch units associated with the amount banks. This movement is accomplished through arms, like arm 127, in the same manner as described in connection with the amount banks' guide and actuating member 118. At the beginning of the next operation, rocker arms like rocker arm 201 (Fig. 3B) restore the depressed plungers in the three "type of operation" switch units by the action of arms, like arm 199 (Fig. 14), in the same manner as the arm 235 in Fig. 3B associated with the auxiliary guide and actuating member, being secured to the same shaft 185.

Figure 12:
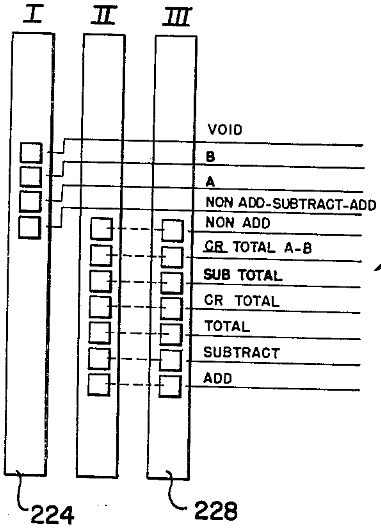
Fig. 12 is a diagrammatic representation of the three banks of switches representing the type of operation.
Figure 15:
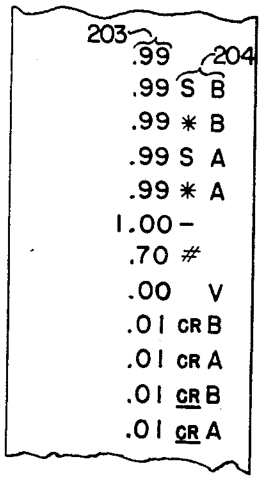
Fig. 15 shows a sample of tape printing made by the machine during various types of operation.

Referring to Fig. 12, the leftmost auxiliary switching unit 224 is shown diagrammatically, from above, under "I." In Fig. 12, the four small squares represent the heads of four plungers, only four being needed in this bank because of the construction of the machine. The topmost plunger represents the operation of the machine under control of the "Void" key. The second plunger from the top represents the operation of the machine in taking a total from the "B" totalizer under control of the "B" total taking control key. The third plunger from the top indicates the taking of a total from the "A" totalizer. The lowermost plunger is operated in non-add, subtract, and adding operations, which have no designation on the printed tape. The righthand column of the sample printing bracketed by bracket 204 in Fig. 15 is under control of the same mechanism as selects the proper plunger in the switch unit 224, just described. The type bar 238 (Fig. 8) shows the type 239, and the indicia each type bears is shown at the right.

Figure 9:
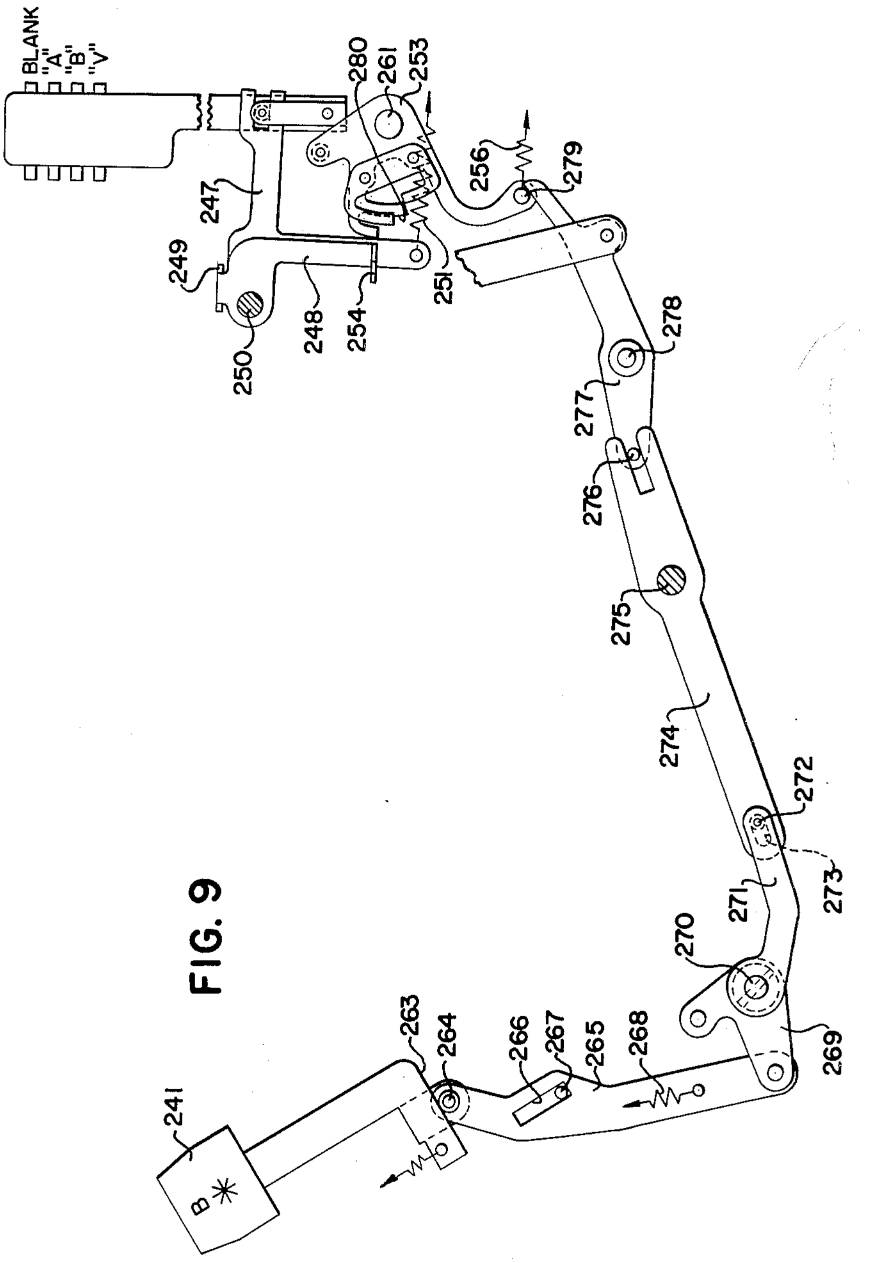
Fig. 9 is a detail of the mechanism showing the means by which the sign type-bar and switch setting controls are adjusted by the "B" key.

First there will be considered the operations in which the machine is operated under control of either the non-add key, the add motor bar, or the subtract motor bar. An offset bell crank lever having a rearwardly extending arm 247 (Figs. 8, 9 and 11) and a downwardly extending arm 248, said arms being connected by a bail 249, is pivoted on a frame supported stud 250. This bell crank lever is constantly urged counter clockwise by a spring 251, but is normally restrained by roller stud 97 (see especially Fig. 11) on slide 95. As the machine operation commences, the slide 95 moves rearwardly, releasing said bell crank lever which is controlled in its extent of movement, as will be explained. The rearward end of arm 247 is bifurcated and embraces a stud 252 near the bottom of type bar 238, and type bar 238 moves upwardly from the normal position shown in Fig. 8, according to the extent of counter clockwise movement of said offset bell crank lever. A multiple-armed lever 253 controls the extent of counter clockwise movement of the offset crank lever by reason of its differential positioning under control of the operation control keys, in the following manner. The downwardly extending arm 248 of the offset bell crank lever has a bent-over ear 254, the rear edge of which cooperates with the various arms on multiple-armed lever 253 which act as stops. Multiple-armed lever 253 is kept in a normal position, shown in Fig. 8, against counter clockwise movement by the inpringement of a stop stud 255 against the edge of a slot in the right frame plate, said slot not being shown, by a spring 256, secured to the downwardly extending arm of lever 253. As the mechanism is shown in normal position in Fig. 8, there is a slight gap between ear 254 and the front edge of arm 257 of lever 253. In add, subtract, and non-add operations the bell crank arm 248 is permitted to move against arm 257 so the type bar 238 is raised a sufficient distance to bring the blank type member into line with the printing hammer. No print will be made during such machine operations, in the righthand column of the two columns 204, in Fig. 15. In taking a total or subtotal, which are two-cycle operations, as described in the Frieberg, et al., Patent 2,692,726, to which reference is made, no print is made in the first cycle, as the type bar levers are not allowed to rise. At the beginning of the second cycle of a total-taking or a sub-total-taking operation, a link 258 (Fig. 8) is pushed rearwardly, only part of this link being shown as it is an old construction and does not constitute a part of the novel mechanism. The rear end of this link 258 is pivoted to the downwardly extending arm 259 of the total bell crank lever, described in said Friedberg et al. Patent 2,692,726, which is consequently rocked counter clockwise in the second of the two-cycle total-taking or sub-total-taking operations.

Pivoted to arm 259 (Fig. 8) is a rearwardly extending link 260, the rear end of which rests on stud 261, on which multiple-armed lever 253 is pivoted. The link 260 has an upwardly extending arm 262, which normally just comes to rest on stud 255 in multiple armed lever 253. As link 260 is moved rearwardly upon a counter clockwise movement of bell crank lever 259, arm 262 pushes multiple-armed lever 253 clockwise until the front edge of arm 263 presents itself in front of ear 254 so that upon the second cycle of a total or sub-total-taking operation, as the arm 248 moves counter clockwise, it will encounter said front edge of arm 263, stopping the type bar 238 with the character "A" opposite the printing hammer and the printing line, and at printing time "A" will be printed in the righthand column of the characters 204 (Fig. 15).

At the close of a total or sub-total-taking operation, the parts are returned to normal, as shown in Fig. 8.

In taking a total or sub-total from the lower totalizer, the key "B*" 241 (Fig. 9) is depressed, and the lower edge of its stem 263 pushes down on a stud 264, secured to a link 265, having a slot 266 in which rides a stud 267 for guidance and support. Link 265 is normally held in the "up" position by a spring 268. Link 265 is pivoted at its lower end to an arm 269, secured to a shaft 270, running from the left side of the machine to the right side. To the right end of shaft 270 is pinned an arm 271, having a stud 272 in its rear end, which stud engages a slot 273 in a lever 274 pivoted at 275 to the machine framework. The rear end of lever 274 is bifurcated and embraces a stud 276 in a lever 277 pivoted on a frame supported stud 278. The rearwardly extending arm of lever 277 strikes spring anchor stud 279 in lever 253, as the key 241 is depressed, rocking lever 253 clockwise until surface 280 comes opposite the ear 254 on arm 248, allowing the type bar (see also Fig. 8) to rise until the character "B" comes opposite the printing hammer and printing line, whereupon, when printing takes place in the second cycle of the total or sub-total operation, a "B" will be printed in the right column of symbols 204 of Fig. 15.

Figure 1:
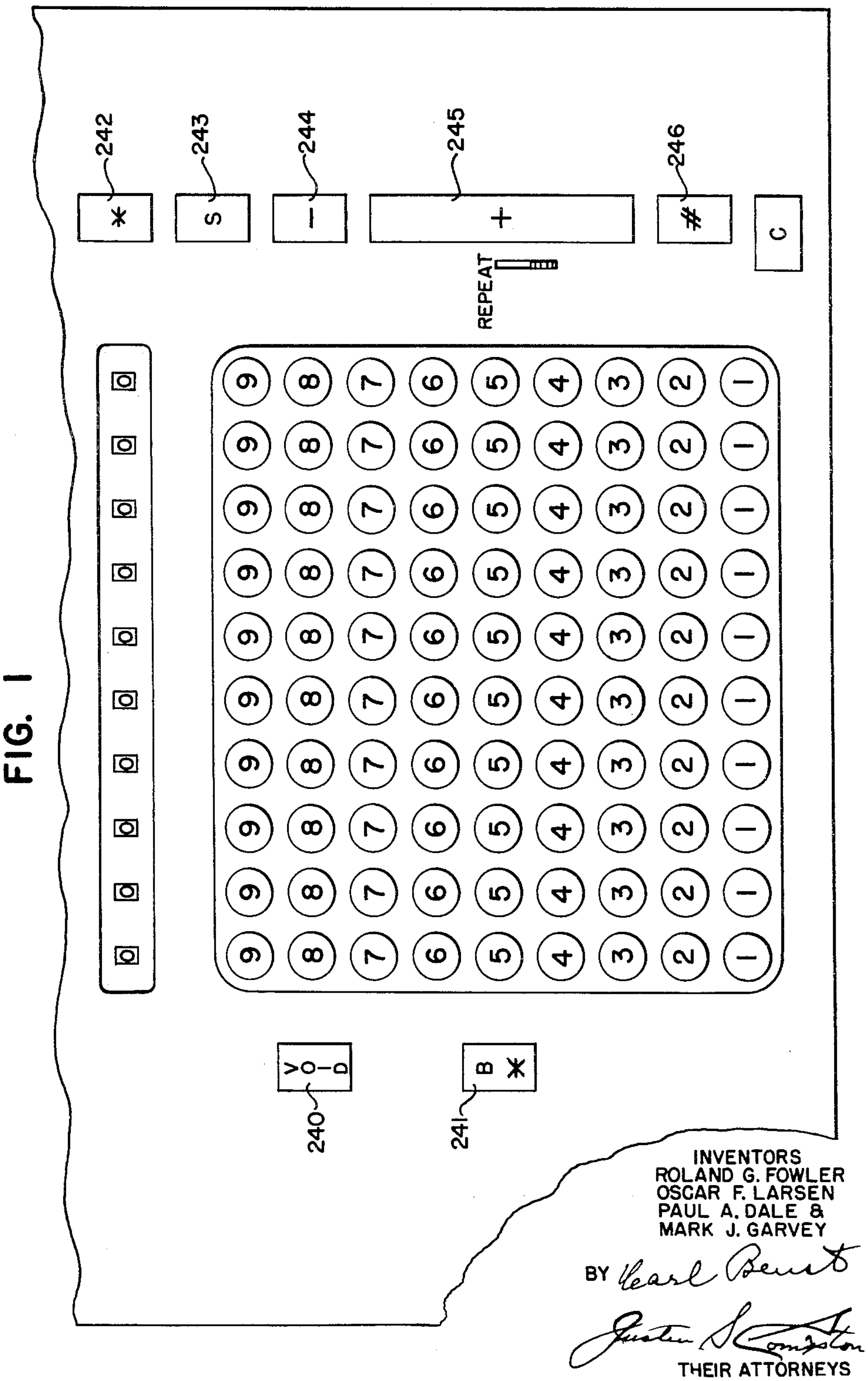
Figure 2B:
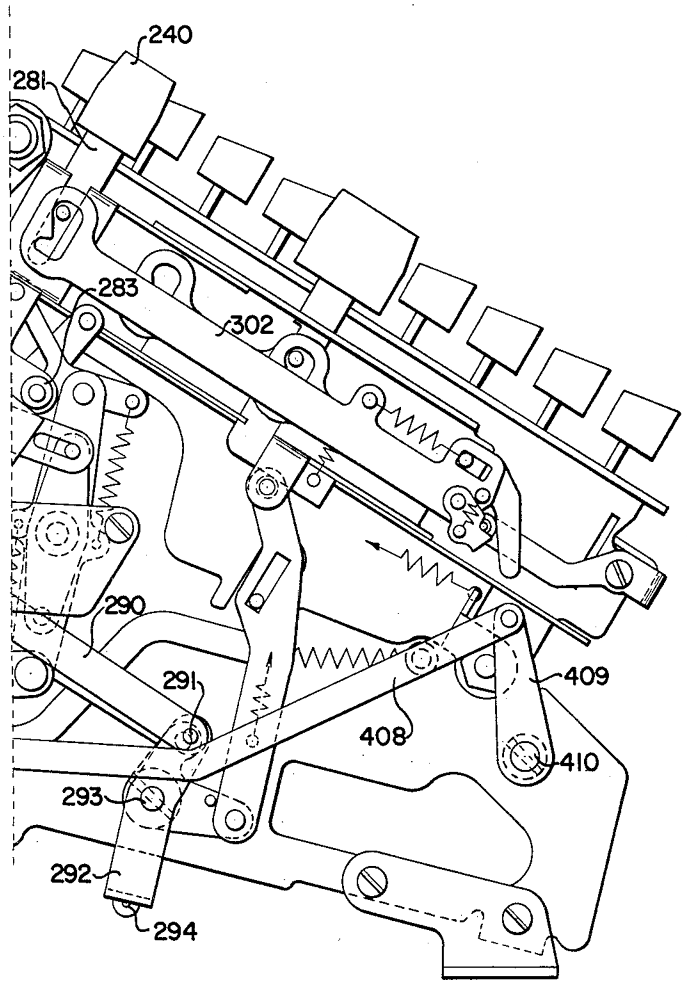

If the "Void" key 240 is depressed and a machine cycle initiated by any one of the keys 244, 245 and 246 (Fig. 1) the machine will go through a single cycle of operation with the following occurring with regard to the printing bar 238 (Fig. 8). Secured to the bottom end of the key stem 281 (Figs. 2A, 2B, and 8) is an angle piece 282 having on its forward end a roller 283 resting on the top end of a link 284, having a slot 285 in which rides a stud 286. The link 284 is resiliently held in the upper position by a spring 287. The bottom end of link 284 is pivoted to one arm of a bell crank lever 288, pivoted at 289 to the side frame of the machine. The other arm of the bell crank lever is pivoted to a link 290, pivoted at 291 to the upper projecting arm 292 of a bail 294 pivoted on cross shaft 293. The bail 294 runs across the under part of the machine and its right end (Fig. 8) is secured to a supporting bell crank lever 295, also pivoted on cross shaft 293. The rearwardly extending arm of bell crank lever 295 has a pin and slot connection, with a lever 296 pivoted to the right framework of the machine at 297. The rearwardly extending finger 298 of lever 296 makes contact with a stud 299 on the forward end of a lever 300 pivoted on stud 278. The rearwardly extending finger 301 of lever 300 is in line to strike stud 279 on the downwardly extending arm of lever 253. As the "Void" key is pushed down and latched by latching member 302 (see Figs. 2A and 2B) the finger 301 strikes stud 279, rocking lever 253 clockwise, to a position where surface 302 is in the path of ear 254 so that upon the machine operation which next follows, the type bar 238 will be raised so that "V" character is in front of the printing hammer and the type will print a "V" in the right column of characters 204 of Fig. 15.

The "Void" key and the "B" total key are both lock-down keys and are restored at the end of a machine operation, by mechanism which it is not necessary here to discuss.

Referring to Fig. 8, in order to set the lever 210, pivoted on shaft 92, in the correct position so that pin 213 will strike the proper one of the plungers of switch unit 224 there is provided, pivoted on a frame-supported pivot 311, a multiple-armed control member 313, having a downwardly extending leg 314, which is held in contact with a shoulder in ear 254 of arm 248 by a spring 315 secured to an upwardly and rearwardly extending arm of said control member. Thus, as arm 248 moves the various distances to position the various type on type bar 238 to printing position, the control member 313 will be rotated accordingly. The forwardly and downwardly extending arm 316 of control member 313 has its front edge notched, in sawtooth fashion, to cooperate with the ear 316 on a member secured to lever 210, so that as arm 207 rocks counter clockwise, in the first half of a machine cycle, the lever 210 will follow until ear 316 hits one of the notched surfaces on arm 316. These surfaces are indicated by the character they control, to wit, "V," "B," "A" and blank, which is indicated in the drawing by a "BL." The pin 213, accordingly, will be positioned over the proper plunger of the switch unit 224, as indicated in Fig. 12, and the contacts will be made therein, according to the control keys used for the particular operation. Electric connections may be made between the recorder and switch unit 224 which the before described mechanism controls.

Figure 10:
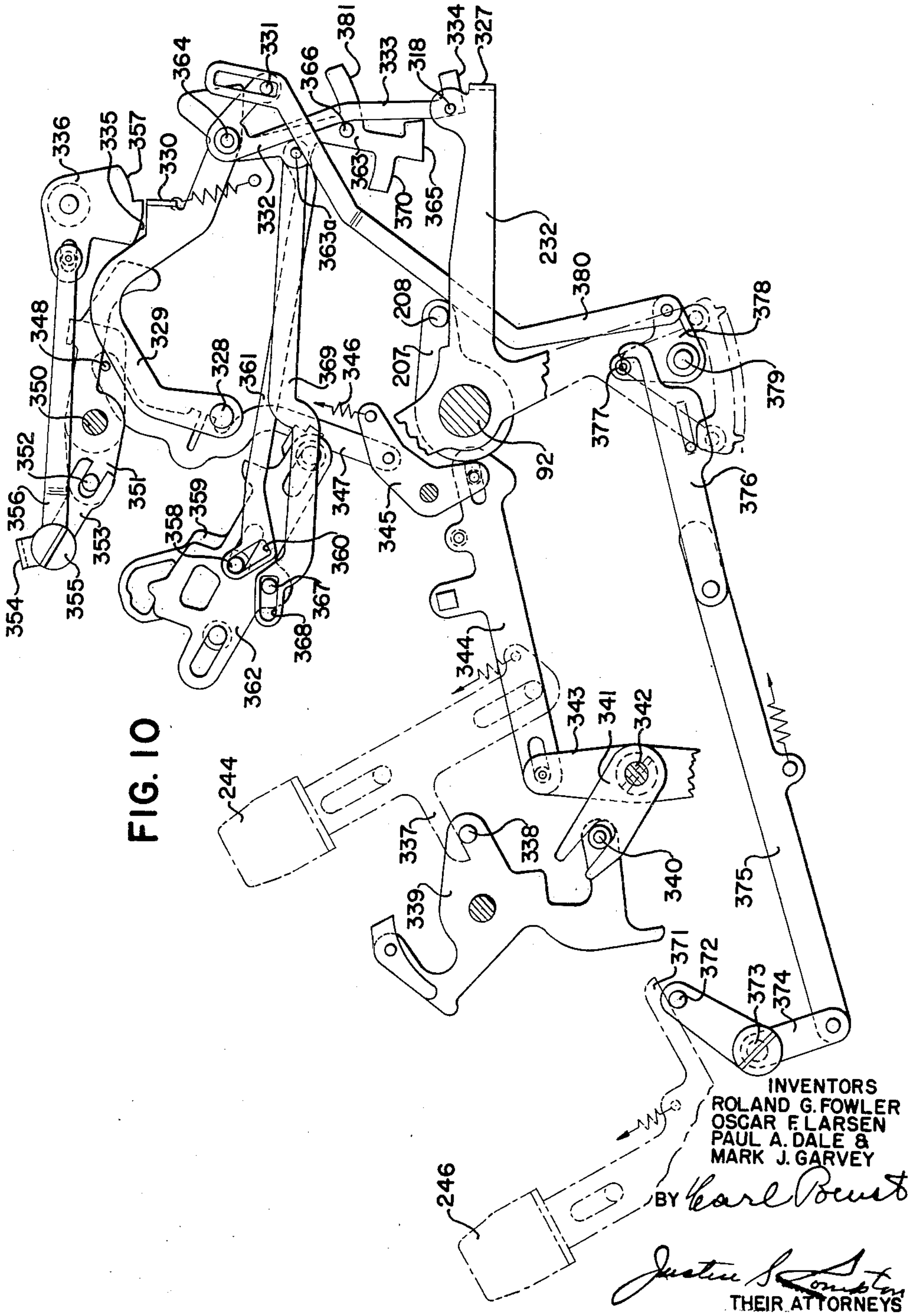
Fig. 10 is a detail of the mechanism for controlling the type of operation sign type-bar and the associated switch setting controls.
Figure 13:
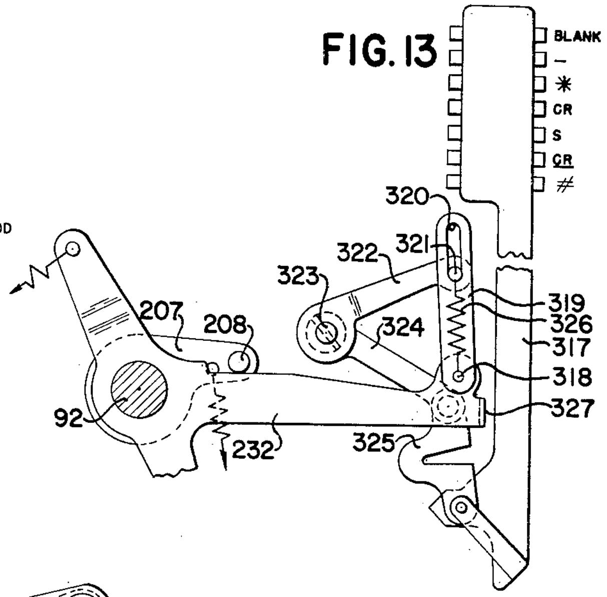
Fig. 13 shows the means for setting the sign type-bar from the differential mechanism associated with switch rows II and III of Fig. 12.

Figs. 3B, 10, and 13 show the machine controls for operating the arms 231 and 232 which are provided to set the switching units 228 and its companion, which is numbered II in Fig. 12, and to set the sign type bar 317 (Fig. 13) which has on it type bearing the characters as shown in Fig. 13. As beforesaid, arm 207 and stud 208 hold arms 232 and 231 in home position when the machine is not operating. The rear end of arm 232 has a stud 318 pivoted to a link 319. Link 319 has a slot 320 embracing a stud 321 on a lever 322, pinned to frame supported shaft 323. On the left end of shaft 323 is pinned a lever 324 (Fig. 13) pivoted to a link 325 the other end of which is pivoted to type bar 317. Stud 321 is held in the bottom of slot 320 by a spring 326 to form a resilient connection between arm 232 and the type bar 317, so in case of sticking of the parts the slot 320 will act as a safety expedient. The extent of movements of arms 231 and 232 as arm 207 turns counter clockwise during the first half of the machine cycle is determined by stops which cooperate with ear 327 on the rearmost end of arm 232. The stop mechanism is shown in detail in Fig. 10, to which attention is directed. Pivoted to the right frame plate of the machine at 328 is a lever 329 having a bent over ear 330. To the rear end of said lever 329 is pivoted a link 332 having a rearwardly and downwardly extending arm provided with a stud 331 and a downwardly extending arm 333 provided with a stop surface 334. In add operations under control of add motor bar 245, when arm 207 starts counter clockwise, arm 232 follows it until the ear 327 strikes stop surface 334 and the top edge of ear 330 strikes a surface 335 on a subtract control piece 336. This gives a slight upward movement to bring the blank type (Fig. 13) opposite the printing hammers, said blank type being the top-most one as shown in Fig. 13. In subtract operations the subtract key 244 is depressed, the arm 337 on the stem thereof bearing down on stud 338 rocking a subtract plate 339, pivoted on the right frame plate, clockwise. On a rearwardly extending arm of subtract plate 339 is a stud 340 embraced by the bifurcated end of a lever 341 pinned to cross shaft 342. Pinned to the left end of cross shaft 342 on the left side of the machine is a lever 343 having a pin and slot connection with a link 344. The rear arm of link 344 has a pin and slot connection with a bell crank lever 345 pivoted on the left frame plate, said bell crank lever being urged counter clockwise, as seen in Fig. 10, by a spring 346 which serves to hold stud 338 on the subtract plate against arm 337 of the subtract key. Pivoted to the upwardly and rearwardly extending arm to bell crank lever 345 is a link 347, the upper end of which is pivoted (see Fig. 2A) to the left arm of a yoke 349 pivoted at the point 350 to the left side frame of the machine. The other arm 351 of said yoke (see Fig. 10) has a stud 352 which engages a fork in arm 353 of a bail 354 running from the left hand side of the machine to the right hand side of the machine and supported on its right end by pivot stud 355 in the right frame plate. A rearwardly extending arm 356 on the right side of bail 354 is pivotally engaged with subtract control piece 336 which, when the subtract key is depressed is rocked clockwise as seen in Fig. 10, presenting the subtract stop surface 357 to the ear 330. As the machine starts operating, arm 207 allows counter clockwise movement of arm 232 which, when ear 327 strikes surface 334, raises the link 333 rocking lever 329 counter clockwise until ear 330 strikes subtract surface 357. This allows the type bar 317 (Fig. 13) to rise until the type character "-" is opposite the printing hammers and the type line. In total taking operations the total key 242 (Fig. 1) is depressed and a foot thereon, not shown, presses downwardly and rearwardly on stud 358 attached to the total slide 359, which causes the total slide 359 to slide downwardly and rearwardly to start the machine in a total taking double machine cycle, as described in the U.S. Patent No. 2,665,063 which issued on the application of Nelson Frieberg et al., January 5, 1954. Embracing stud 358 is a slot 360 in a link 361 pivoted at 363*a* to control member 363. Stud 358 projects through a slot in subtotal slide 362 which will be described later. As the stud 358 moves downwardly and rearwardly the link 361 will, at first, pivot clockwise about stud 363*a*, by which it is pivoted to the multiple arm stop control member 363 pivoted on lever 329 at 364. As stud 358 reaches the bottom of slot 360 it gives a slight rearward movement to link 361 sufficient to bring the stop surface 365 in line with ear 327 on arm 232. In so doing, a stud 366 on member 363 moves arm 333 out of the way so that the arm 232 may swing up until its ear 327 makes contact with surface 365. This movement of arm 232 will bring the "*" type as shown in Fig. 13, in line with the printing hammer and the printing position. In sub-total operations the foot of the sub-total key 243, when depressed, impinges upon the stud 367 in the sub-total slide 362. Immediately, because of the stud 367 is in the bottom of a slot 368 in link 369, said link, pivoted to control member 363 begins to move rearwardly, and swings member 363 until the sub-total control surface 370 is in line with the ear 327 on arm 232. At the same time, as was the case with taking of a total, arm 333 is swung out of the way so the ear 327 may make the excursion to the surface 370. The movement of arm 232 under such circumstances allows the type bar 317 (Fig. 13) to rise until the type bearing the character "S" is in front of the printing hammer and such will be printed in the left column of characters 204 seen in Fig. 15. In the case of taking the total if the amount is negative the subtract control piece 336 will be moved so surface 357 is in line with ear 330 and an extra step of movement will be given so that the type bearing the character "CR" is in line with the printing hammers and it will be printed instead of the "*". Likewise, if the sub-total is a negative amount the subtract control piece 336 will be rocked to the position where surface 357 will be encountered by ear 330 giving an extra step of movement to the type bar 317 so the type bearing the character "CR" is opposite the printing hammer and it will be printed in the left column of of characters 204 (Fig. 15). In a non add operation when key 246 (Fig. 10) is depressed its arm 371 bears down on stud 372 of a lever pinned to a shaft 373. Also pinned to shaft 373 is an arm 374 pivoted to subtract control link 375 the rear end of which is pivoted to a slide 376 the rear end of which has an upwardly extending hook engaging the rear of a stud 377 on a bell crank lever 378 pivoted on stud 379, supported by the right frame. As the key 246 is depressed the bell crank lever will be rocked counter clockwise. To its rearwardly extending arm is pivoted a link 380 the upper end of which is slotted and embraces a stud 331 in arm 333. Thus, as bell crank lever 378 rocks counter clockwise the arm 333 will be moved far enough counter clockwise so that ear 327 will miss surface 334 and will come to rest on surface 381 which will allow the type bar 317 (Fig. 13) to move to where the type bearing character "#" is opposite the printing hammer and on operation of the machine the said sign will print in the left column of the characters 204 (Fig. 15) to indicate the non-add operation.

*Interlocks*

Referring to Figs. 5, 6 and 7, to prevent the machine from entering into a cycle of operation while the tape recorder is still in operation a latching means is provided whereby even though the operator trips latch 41, the three-armed lever 39 will only be allowed a slight movement toward trip position insufficient to close the motor switch 31. As the tape recorder is operated, an electric signal is applied to terminals 381 of a solenoid 382 to pull the solenoid armature 383 and the link 384 to which it is attached, to the right, as seen in Figs. 5 and 7. Link 384 is secured to the downwardly extending arm 385 of a yoke pivoted to the rear frame of the machine by a screw 386 and stud 387. Spring 388*a* normally holds the parts in the position shown in Figs. 5 and 7, where the end of link 384, which curles around stud 388 of the solenoid armature, comes to rest against the auxiliary side frame 389. Pivoted on stud 387 is a latching member having an arm 390, with a stud 391 bearing against arm 385 and having an upwardly extending arm 392, having a surface 393 and a shoulder 394. The stud 391 is kept resiliently in contact with arm 385 by means of a spring 395 coiled around the stud 386, one end passing through the yoke and the other end passing around the arm 392.

With the above-noted construction, when the armature of the solenoid is pulled in, arm 392 moves toward trip latch 37. If the machine is already tripped and the ear 68 of the latch 37 is down, as viewed in Fig. 5, the surface 393 will strike the edge of it without effect. As soon as the trip latch is restored to the position shown in Fig. 5, arm 392 is able to move sufficiently so that shoulder 394 will come under ear 68 and if the machine is tripped, the latch member 37 will have only a slight tripping movement as it comes to rest on said shoulder, and this movement is insufficient to close the motor switch 31. Nevertheless, at the conclusion of the recorder cycle, when the signal is removed from terminals 381 of the solenoid, the arm 392 is moved to normal position and the latch member 37 can continue its movement to close the switch 31 and start the machine in operation. This interlock is provided so that if, while the tape recorder is still running, the operator sets up amounts on the keyboard of the machine and presses the motor bar, the setting of the switches from the previous operation of the machine will not be disturbed until the tape recorder has finished its recording of the previous operation.

Referring to Fig. 2A, there is mounted on frame supported pivot 396 a lever 397, to which is resiliently coupled a companion lever 398 also pivoted on pivot 396. On the right end of said lever 398 there is a bifurcation which straddles a stud 399 in a lever 400, pivoted to the frame at 401*a*. The lever 400 is urged counter clockwise, as seen in Fig. 2A, by a spring 401, which urges lever 397 clockwise to the position shown in the drawings, against a stop, not in a position to be seen in the drawings. As the roller 402 reaches surface 403 on lever 397, it rocks said lever and its companion lever 398 counter clockwise, closing a switch to start the tape recorder. Roller 402 leaves the lever 397 after a short engagement with lever 397, and lever 397 returns to the position shown. Thes witch which is closed by lever 398 is directly behind switch 404, which will be described next. The rearward end of lever 398 has an ear 405 adapted to be caught by a shoulder 406 on a lever 407 pivoted to the frame plate of the machine. If lever 407 is rocked clockwise from the position shown, it will engage ear 405, preventing the tape recorder starting switch from closing, the movement of lever 397 being taken care of by the resilient connection with lever 398. Lever 406 is given the latching clockwise movement on the forward movement of link 408 pivoted thereto by reason of it being pivoted at its forward end (see (Fig. 2B) to a lever 409 pinned to a shaft 410, which is given a clockwise movement during the first cycle of a total taking operation. This shaft 410 which may be seen in Fig. 3A, protruding from the right side frame of the machine is secured to a cam lever 411. The cam lever 411 is rocked counter clockwise, as seen in Fig. 3A, by means disclosed in United States Patent 2,666,574, which issued on the application of C. H. Carlson et al., on January 19, 1954, and stays that way during the first cycle of a total or sub-total operation. At the same time roller stud 402 strikes surface 403 (Fig. 2A), it also strikes surface 412 on lever 413, also pivoted on pivot 396. As lever 413 is thus rocked counter clockwise a stud 414*a* thereon closes switch 404 to complete a circuit through the tape recorder to supply the motor 30.

Referring to Fig. 6, when the tape recorder is connected to the machine, a switch 414 is opened, and the circuit for energizing the motor is by-passed through circuit 415, having a normally closed switch 416. When the recorder starts, this switch 416 opens, and in order to preserve the complete circuit for energizing the motor 30, a second bypass circuit 417 is provided to complete the circuit through the closing of switch 404, to which reference was made in connection with Fig. 2A. These parts, which are operated by roller 402 (Fig. 2A), are described because they are part of the machine which is operated by the machine's main actuating mechanism to control the recorder.

What is claimed is:

1. In a calculating machine for electrically controlling a data-handling device by switches, the combination of a cyclically operable main operating means; a series of differential actuators representing amount data and type of operation data, said actuators being individually released for movement during a machine cycle; amount control keys for controlling the extent of movement of amount representing differential actuators during a machine cycle so that each moves a distance to indicate the value of the amount key controlling it; type of operation control keys for controlling the extent of movement of type of operation differential actuators during a machine cycle so that each moves a distance to indicate the type of machine operation; a switch-unit for each actuator, each unit having an individual data-handling device control switch for each possible moved position of the associated differential actuator, and each switch movable during a cycle of machine operation from a normal open position to a closed position; switch moving means mounted on each differential actuator for movement on the differential actuator transverse of the movement of the differential actuator and operable by the transverse movement to move the switch at which the differential actuator is positioned, to closed position; and means operated by the main operating means, after the differential actuators have been positioned during a cycle, to move the switch moving means transversely of the actuator so the corresponding switches are closed.

2. The structure of claim 1 in which each of said differential actuators is provided with an outwardly-directed pin member; said switch-moving means comprises a sleeve member slidably carried by each pin member; and said means operated by the main operating means comprises a shiftable guide and actuating member operably connected with each sleeve member, whereby each sleeve member, in one position of said guide and actuating member, is spaced a distance from its corresponding switch, and whereby each sleeve member, in another position of said guide and actuating member, is moved along its pin member to engage and close the corresponding switch.

3. In a calculating machine for electrically controlling the operation of a data-handling device by switches, the combination of a cyclically operable main operating means; a series of differential actuators representing operational data for said device, said actuators being individually released for movement during a machine cycle; control keys for controlling the extent of movement of the differential actuators during a machine cycle so that each moves a distance to indicate the data of the control key controlling it; a switch unit for each actuator, each unit having an individual data-handling device control switch for each possible moved position of the associated differential actuator, and each switch movable during a cycle of machine operation from a normal open position to a closed position; a sleeve member slidably mounted on each differential actuator for movement on the differential actuator transverse of the movement of the differential actuator and operable by the transverse movement to move the switch at which the differential actuator is positioned, to closed position; and a shiftable guide and actuating member operably connected with each sleeve member, said guide and actuating member being shiftably operated by the main operating means, after the differential actuators have been positioned during a machine cycle, to move the sleeve member in each instance transversely of its actuator so that the corresponding switch is closed.

References Cited in the file of this patent

UNITED STATES PATENTS

| | | |
|---|---|---|
| 2,014,432 | Gerhold | Sept. 17, 1935 |
| 2,074,006 | Von Pein | Mar. 16, 1937 |
| 2,285,353 | Peirce | June 2, 1942 |
| 2,490,348 | Ghertman | Dec. 6, 1949 |
| 2,634,340 | Batcheller | Apr. 7, 1953 |
| 2,773,139 | Forstrom et al. | Dec. 4, 1956 |